United States Patent [19]
Wilson et al.

[11] Patent Number: 5,295,188
[45] Date of Patent: Mar. 15, 1994

[54] PUBLIC KEY ENCRYPTION AND DECRYPTION CIRCUITRY AND METHOD

[76] Inventors: William J. Wilson, 1239 Blevins Gap Rd., Huntsville, Ala. 35802; Charles L. Craig, 2610 Rita La., Huntsville, Ala. 35816

[21] Appl. No.: 680,331

[22] Filed: Apr. 4, 1991

[51] Int. Cl.$^5$ ............................................. H04L 9/30
[52] U.S. Cl. ........................................ 380/30; 380/9; 380/23; 380/24; 380/25; 380/49; 380/50; 235/379; 235/380; 340/825.31; 340/825.34
[58] Field of Search .................... 380/9, 30, 37, 44, 49, 380/50, 46, 23-25; 235/379, 380; 340/825.31, 825.34

[56] References Cited

U.S. PATENT DOCUMENTS 4,520,232  5/1985  Wilson ............................. 380/49 X
4,668,103  5/1987  Wilson ................................ 380/30

*Primary Examiner*—Bernarr E. Gregory
*Attorney, Agent, or Firm*—Phillips & Beumer

[57] ABSTRACT

A high-speed public key cryptosystem is constructed for the encryption and decryption of digital data blocks, the creation and verification of digital signatures, and the creation of verifiable random number sequences. The encryption and decryption techniques employ a public key K constructed as the matrix product of a randomly generated nonsingular matrix M, and a rectangular template matrix T having row identifiers imbedded therein for selecting rows of a matrix M-1 that participate during decryption. Encrypting of a plaintext block, is achieved by converting the block to a nonlinear row selector code used to select rows of K. Columns of the selected rows are then added modulo-2 to produce a block if ciphertext. Deciphering the ciphertext is an iterative process wherein successive row identifiers and plaintext bits are unmasked by selecting rows of matrix M-1 in accordance with the bit states of the ciphertext, and adding columns of the selected rows modulo-2 to produce an intermediate block of data containing 2 plaintext bits and a row identifier used to select a row of key T, which is then added modulo-2 to the intermediate block to reveal the next two bits of plaintext and the next row identifier. A public key consisting of a single, noninvertible, binary matrix and a private key consisting of a pair of binary matrices, one or which is singular and the other nonsingular.

47 Claims, 6 Drawing Sheets

Microfiche Appendix Included
(1 Microfiche, 59 Pages)

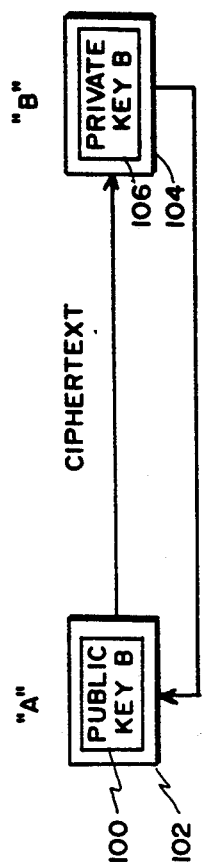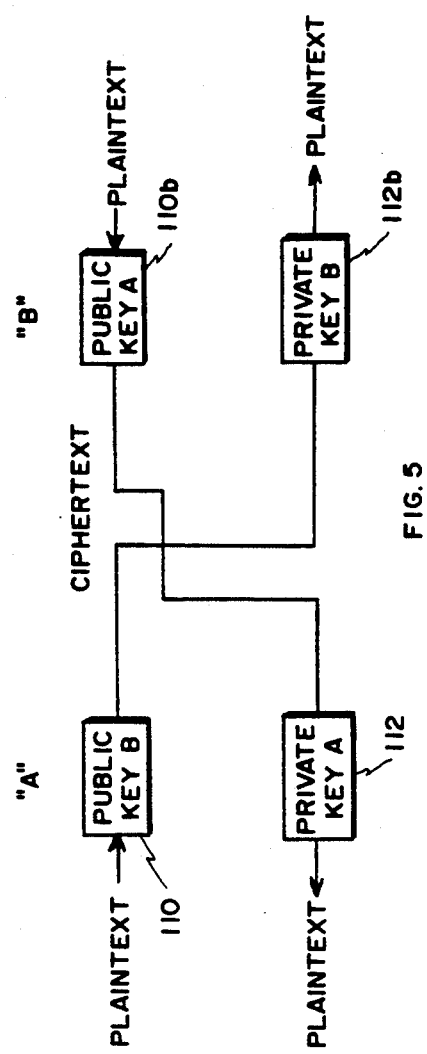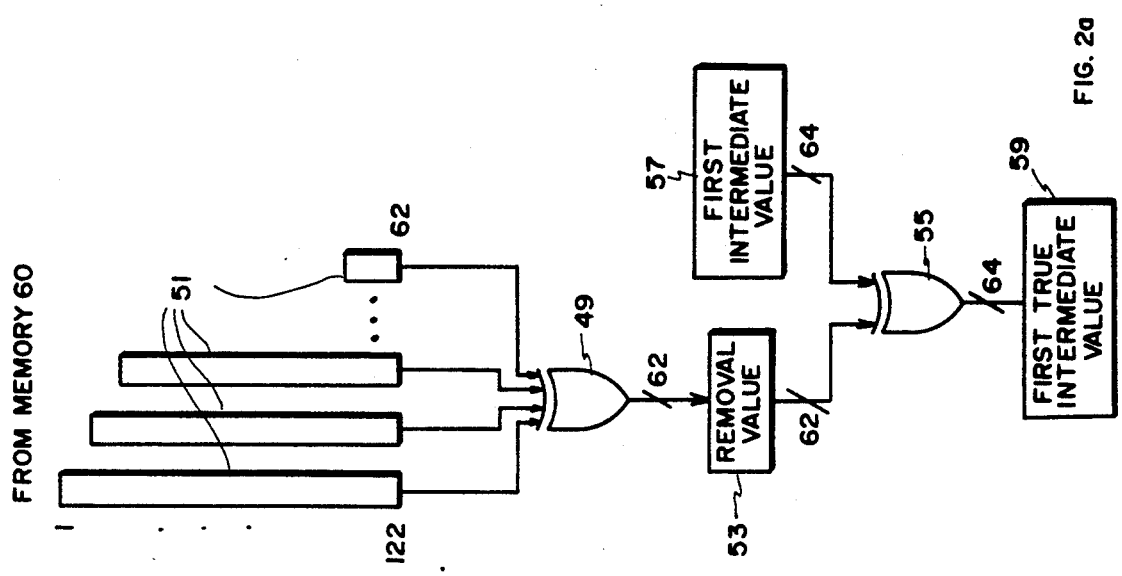

PUBLIC KEY ENCRYPTION AND DECRYPTION CIRCUITRY AND METHOD

REFERENCE TO MICROFICHE APPENDIX

This application contains a microfiche appendix of one sheet of microfiche film containing 59 frames.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates generally to systems for encryption and decryption of digital, or binary, data and particularly to a public key cryptosystem for block encryption and decryption of such data and for providing systems for achieving digital signatures for use in source message authentication processes and in devices such as "smart card" devices.

BACKGROUND OF THE INVENTION

There are many instances in the processing, storage, and transmission of proprietary digital, or binary, data where it is desirable for purposes of security and conservation of bandwidth to translate a series, or block, of binary data into a like ordered block of data wherein discrete bits thereof are changed to an opposite state in accordance with a reversible cryption, or transforming, procedure, encrypting the block of data. Decryption of such a block of data is achieved by application of the inverse process to that of the encryption process, reversing the bits acted upon by the encryption process back to their original state and recovering the original data. In the past, such block, or polygraphic encryption, has required a significant number of discrete operations and has been relatively slow and costly as well as fixed and limited in key size and security. In addition, block cryption schemes have typically been private key systems requiring a secure transmissions channel for distribution of the private keys. Also, these systems are generally incapable of producing digital signatures and source message authentication. Lastly, to achieve nonlinear transforms, contemporary private key systems such as the ANSI Data Encryption Standard (DES), because of their complexity, generally require dedicated hardware implementations to achieve the speeds necessary to operate in-line with high speed communications channels.

Of the few public key systems that have emerged, the best known is the RSA system, disclosed in U.S. Pat. No. 4,405,829, issued in September 1983, to Rivest et al., which shows a system for encoding data as a number M in a predetermined set, raising that number to a first predetermined power, and computing the remainder when the exponentiated number is divided by the product of two predetermined prime numbers, with the remainder being the ciphertext. To decipher the ciphertext, the ciphertext is raised to a second predetermined power and the remainder computed when the exponentiated ciphertext is divided by the product of the two prime numbers, with the remainder being the original text.

Although widely used, the RSA system is slow and unwieldy, making it unsuitable for general message encryption and decryption and for inexpensive authentication devices, such as "smart card" devices, thereby limiting its use to transmission of private keys and digital signature and authentication purposes. In addition, the security of the RSA system depends on the unproved difficulty of factoring large numbers, which is threatened by ever-improving advances in factoring techniques, such as those noted in the Jun. 29, 1990, issue of *Science*, Vol. 238, page 1608.

Another public key system, the McEliece system as disclosed in "A Public Key Cryptosystem Based On Algebraic Coding Theory," DSN Progress Report 42-44, Jet Propulsion Laboratory, pp. 114-116, 1978, by McEliece, is workable in theory but overly complex, operates at less than fifty percent bandwidth, and has no digital signature capability. Other public key systems, such as "Knapsack Cryptosystems," disclosed in U.S. Pat. No. 4,218,582, issued on Aug. 19, 1980, to Hellman et al., and U.S. Pat. No. 4,399,323, issued on Aug. 16, 1983, to Henry, have been demonstrated to be insecure, as noted in "Breaking Iterated Knapsacks," by E. F. Brickwell, "Advances In Cryptology," proceedings of "Crypto 84," pp 51-60.

A system which is probably closest to applicants' system is system disclosed in U.S. Pat. No. 4,520,232, entitled "Polygraphic Encryption-Decryption System," to William J. Wilson (one of applicants), issued May 28, 1985. In this system, first digital memory in the encryption device is configured as a binary matrix, which is loaded with an invertible (possessing an algebraic inverse) binary matrix, this matrix forming the first of a pair of private keys. Binary data to be encrypted is "ANDed" with rows of the matrix, selecting certain rows of the matrix in accordance with the bit states of the data, and columns of selected rows are "exclusive-ORed" to produce the ciphertext. To decrypt the ciphertext, a second private key matrix which is an algebraic inverse of the first private key matrix is loaded into a second matrix-configured memory, and the ciphertext is "ANDed" with this second matrix. As with the encryption process, rows which are selected by this "ANDing" process are also "exclusive-ORed," producing the original data. While this system works relatively well, its linear cryptographic transforms are not as secure as the nonlinear transforms of the present invention. In addition, it does not provide for digital signature capabilities.

Accordingly, it is an object of this invention to provide a single, comprehensive public key cryptosystem of sufficient simplicity, speed, and security to allow the in-line performance in high-speed commercial communications and data channels of the major cryptographic transformations of encryption, decryption, and digital signature generation and for off-line creation of paired public and private keys for implementing such transformations.

Additionally, it is an object of this invention to provide a cryptosystem wherein the nonlinear cryptographic transforms effected by the public key cannot be reversed by linear algebraic transformations.

Still further, it is another object of this invention to provide random number sequences that can be verified, if necessary, in the manner of digital signatures.

SUMMARY OF THE INVENTION

This invention relates to a method for concealing and revealing a set of plaintext binary or digital data by transforming the plaintext set by a nonlinear transformation into a second set of digital data. This second set of digital data is then transformed to a ciphertext by application of a consolidation K of discrete linear transforms to the second set, with the discrete transforms of K not derivable from K. The ciphertext so generated is converted back to plaintext by an ordered application of transforms having particular properties to effect a series of inverse processes to that of the discrete linear transforms that are combined to produce consolidation K.

BRIEF DESCRIPTION OF THE DRAWINGS

FIG. 2a is a schematic representation for a method or eliminating the effects of replacement bits in the present invention.

FIG. 4 is a diagrammatic illustration of a unidirectional, or simplex, communications scheme utilizing the present invention.

FIG. 5 is a diagrammatic illustration of a bidirectional, or duplex, communications scheme utilizing the present invention.

DESCRIPTION OF THE PREFERRED EMBODIMENT

Figure 1:
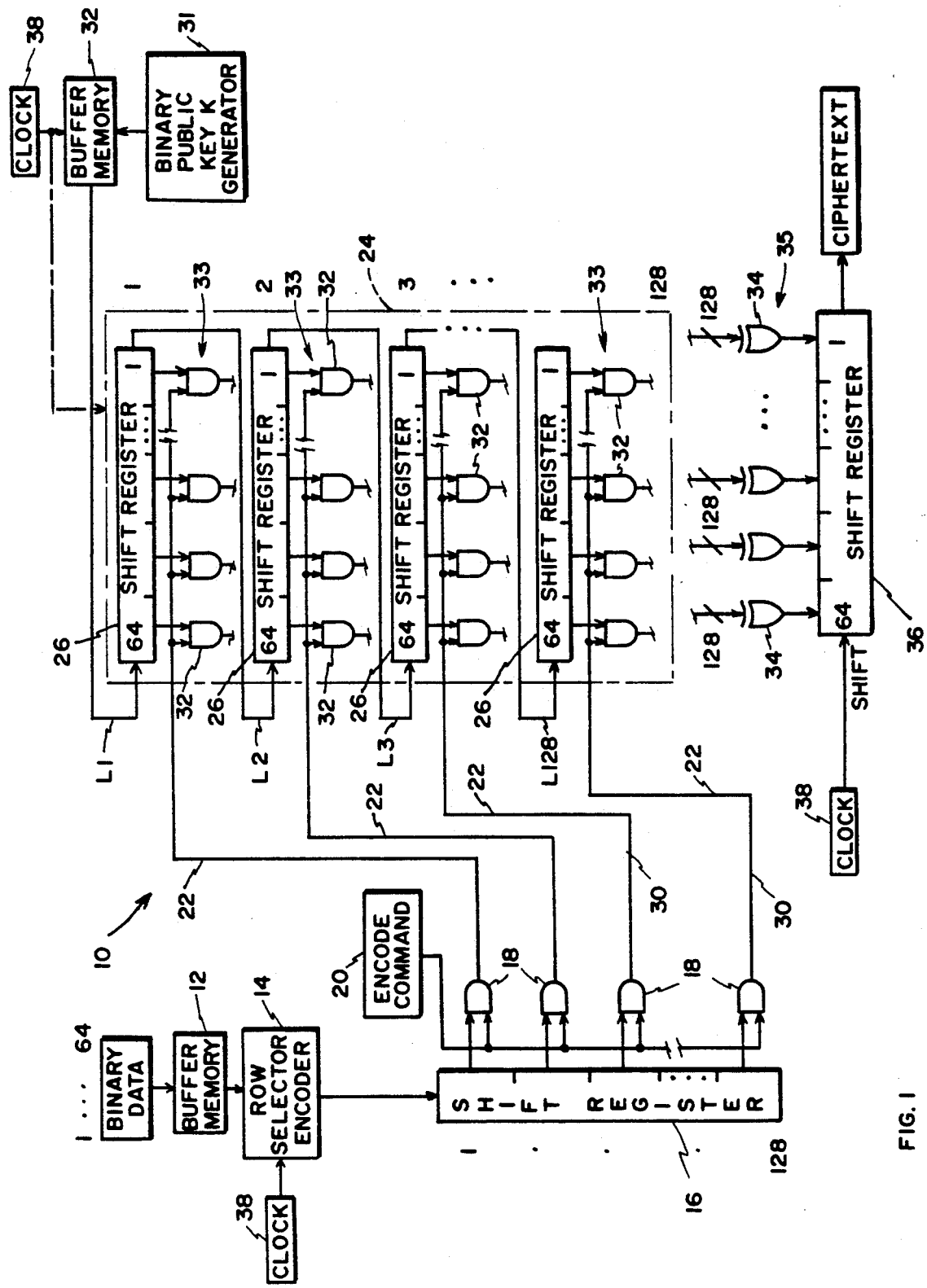
FIG. 1 is a schematic representation of an encryption module of the present invention.

The subject invention provides a rapid, asymmetric method for achieving reversible and verifiable nonlinear cryptions, or cryptographic transforms, of digital or binary data under control of a pair of transforming tools, one being a series of discrete cryption transforms and the other being a consolidation of the discrete cryption transforms. This consolidation is constructed such that the series of discrete cryption transforms provides a means for achieving the inverse transformation of the consolidated processes and cannot be derived from the consolidated cryption transform. In this sense, the cryption of data described herein is a nonlinear process, meaning that there is no mathematical equation or set of equations that can be used to decrypt data crypted by the instant invention. Such an arrangement of transforming tools, herein implemented as radix 2 or m x n binary matrices, though possible in any radix, can serve many useful data security and verification functions such as public key cryptography, digital signature creation and verification, source message authentication, and random number generation and verification.

Accordingly, the public key for the present public key cryptographic invention consists of a single, noninvertible, rectangular, binary matrix K of dimension $m \times n$ (where m conventionally designates the number of matrix rows and n designates the number of matrix columns) where $m > n$, and where K is formed as the matrix product, or consolidation, of a pair of private key binary matrices designated matrix T and matrix M such that $K = T \times M$. Public key K is generally used for encryption transforms and digital signature validation while private keys T and $M^{-1}$ are generally used for decryption transforms and digital signature creation.

Matrix T is a singular, rectangular binary matrix identical in dimension to K and constructed in several phases. In the first phase, a series of smaller $4 \times 2$ submatrices containing a set of bits of a first category, a row identifier category, comprising unique binary "row identifiers" stationed along a diagonal of an initially all-zero matrix T. The purpose of the row identifiers (also incorporated in K in disguised form) is to insure their injection in an even more disguised form into the ciphertext, allowing the private key holder to precisely identify the rows of K participating in each ciphertext production and reveal the plaintext bits governing the row selection of matrix K implemented in the encryption process. To avoid an otherwise sparse matrix and to preclude the possible derivation of matrix T or M from the consolidated public key K, two other "hardening" steps are employed in the creation of T wherein a second category of bits is included in matrix T to disguise the row identifier bits. The area of T above and to the right side of the diagonal is filled with randomly generated "noise bits," and the area of T below and to the left side of the diagonal is filled with randomly generated values designated "replacement rows," completing the construction of T.

Replacement row values are constructed such that their modulo-2 sum is zero, causing them to vanish automatically in the encryption process; if not so constructed, their nonzero modulo-2 sum must be removed as an alternate step in the decryption process. A special, iterative "deconvolution," or "noise bit removal," process is used in the decryption process to remove the effects of noise bits from the generated ciphertext.

Matrix M is a randomly generated, nonsingular $n \times n$ binary matrix serving as a matrix multiplier for disguising matrix T in its consolidated public key form $K = T \times M$ and whose inverse $M^{-1}$ serves as a private key in the decryption process. As noted, the public key K is created by multiplying matrix T by matrix M, with the resulting matrix K used "as is" as a public key or further hardened by being randomly jumbled in row groups to complete construction of a hardened public key K. The effects of jumbling, if used, are removed by a final unjumbling step in the decryption process.

Encryption transforms of plaintext are a simple, two-step process accomplished by first converting the subject plaintext block of length n in a nonlinear manner to a larger block size m representing a row selector code. Rows of K are then selected according to the bit states of the row selector code and columns of the selected rows added modulo-2 to produce a ciphertext block of length n. This second step is seen to be analogous to multiplying the expanded plaintext block as a $1 \times m$ row vector by public key matrix K.

Decryption transforms are accomplished in an ordered process including several steps assisted by the private keys. The first step consists of selecting rows of private key $M^{-1}$ according to discrete bits states of the ciphertext and adding columns of the selected rows modulo-2 to produce an intermediate block of data. Like the above-mentioned encryption step, this step is equivalent to multiplying the ciphertext block as a 1'n row vector by private key $M^{-1}$ to create the intermediate block. As a result of this step (and owing to the special construction of public key K), the two most significant bits of the intermediate block are seen to be the two most significant bits of plaintext and also a "row identifier" which is then used in conjunction with private key T to "unmask" the next two most significant bits of plaintext. This "row identifier" is used to select a portion of the appropriate row of private key matrix T, which is added modulo-2 to the intermediate block to remove the effect of noise bits, thereby revealing the next two plaintext bits and the next row identifier. This deconvolution process is performed iteratively left to right until all bit pairs of plaintext have been recovered in like manner. The final step, if row jumbling of the public key has been employed, consists of "unjumbling" the now recovered plaintext bits.

Digital signatures are created by submitting the desired digital signature S to the decryption process noted above to create a transformed digital signature S* which may then be categorically verified by encrypting S* by the public key to create the digital signature S.

Random number sequences useful in a wide variety of applications, including the generation of cryptographic keys themselves and the construction of stream ciphers, may be freely created by submitting a series of inputs (usually a number series) to the decryption process. The resulting output constitutes the random number sequence. For uses such as multi-user arbitration and semaphore establishment in shared network or secure computer environments, such random number sequences or values can be categorically verified in the manner of digital signatures where needed. For example, to establish a precedence between two contending processes A and B of equal priority (where A holds the private key and B holds the corresponding public key), A can submit an input of his choice to B who transforms it with his private key allowing the odd/even parity of the result to resolve the contention. A can verify that B's result was fair and equitable by transforming it by his public key to recover the input he originally submitted to B.

Figure 1A:
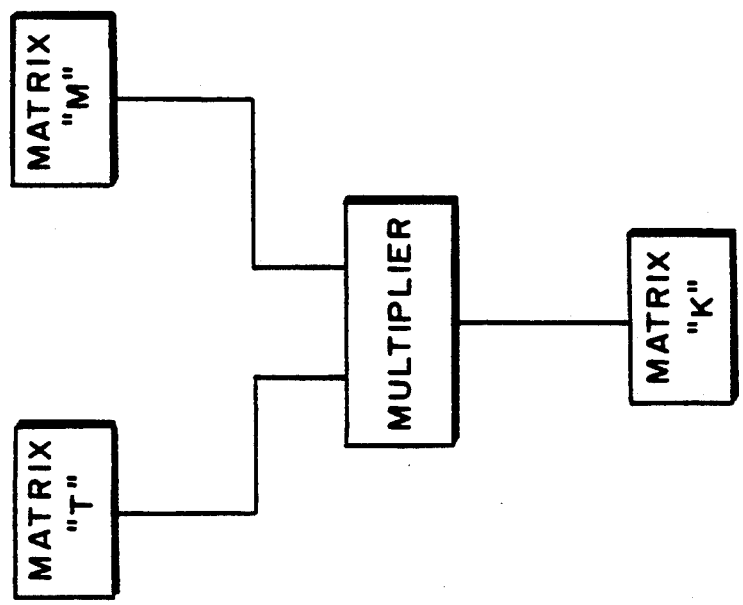
FIG. 1a is a block diagram of a key matrix production system of the present invention.

Fundamentally as shown in FIG. 1a, and as discussed above, a public key K is formed by multiplication of a pair of private key binary matrices, designated as matrix T and matrix M. Matrix T is illustrated hereinbelow, and is a singular matrix with each row including at least one discretely positioned binary row identifier which identifier effects a different binary value on a row than that effected by the for identifiers of other rows of matrix T. Matrix M is a nonsingular matrix, preferably randomly generated.

Turning now to a hardware embodiment of the present invention, and initially referring to FIG. 1, an encryption circuitry 10 is shown for encrypting proprietary binary data, or plaintext, into a ciphertext disguising the data for transmission over an insecure communications channel. The data is represented initially in the form of a serial bit stream, as from a keyboard (not shown), in which case it is input directly to a buffer memory 12, or it may originate initially as an analog signal, as in voice communications. In the case of an analog signal, it is necessary to digitize the signal by an A/D converter (not shown) prior to inputting the signal to buffer memory 12.

The initial block of plaintext data from buffer memory 12 initially is applied to a row selector encoder unit 14, which may be a ROM (read only memory), and ancillary components, the ROM loaded with software and a look-up table for translating and expanding the plaintext data into a larger row selector code, or encoder unit 14 may be electronic in nature, consisting perhaps of an encoder that successively encodes each successive, two-bit segment of the plaintext in accordance with the row selector code. This code, in a preferred embodiment, is a serial, nonlinear code of four-bit segments for each two bits of plaintext, with each segment comprising a row selector bit that is used to select a single row of a four row segment, or fourlet, of a memory 24, the single, selected row participating in the encryption process. For instance, and referring to FIG. 1, each two-bit segment of the plaintext, which may be in blocks of data in multiples of two for any desired block size, is converted to a four-bit, nonlinear segment wherein:

| | |
|---|---|
| 00 = | 1000 |
| 01 = | 0100 |
| 10 = | 0010 |
| 11 = | 0001 | for reasons that will become clear henceforth. It is to be noted that in these four-bit segments, three of the non-selecting bits are of one logic state, with the selecting bit being of the opposite logic state, in this case a "one," which is the row selector bit for a row of a fourlet of memory 24. Additionally, the pattern of selecting bits, or "one" logic states in the row selector code, correlates with the pattern of the diagonal of row identifier submatrices in matrix T. Other patterns and diagonals may be used as long as the row identifier submatrix pattern correlates with the pattern of selecting bits in the row selector code.

This converted plaintext is applied serially to a shift register 16, which, in this example, is composed of 128 discrete memory locations, although size of the blocks of data to be encrypted may be tailored to the application as described. Thus, shift register 16 (vertically orientated in FIG. 1) is loaded with a string of four-bit segments of which one bit of each segment is used to select one row of a fourlet of memory 24. With shift register 16 loaded as described, there appears on outputs of each discrete memory location of shift register 16 a binary logic state, "0" or "1." These outputs are each fed to one input of a separate and discrete control AND gate of AND gates 18, one for each memory location of shift register 16, these AND gates being enabled simultaneously after shift register 16 is filled by a command logic signal from encode command control 20 coupled to the other input of AND gates 18. Thus, outputs from AND gates 18 reflect the row selector code for a 128 bit block and provide this data via leads 22 to a memory 24.

Memory 24 (dotted lines) is illustrated, in this example, as being composed of 128 shift registers, 26 each having 64 serially arranged bit positions wherein each shift register 26 is loaded with a row of matrix K, and like ordered bit positions of these shift registers may be treated as columns of matrix K. For convenience of loading, typically the shift registers would be serially coupled together to permit serial loading as by the interconnection of the last stage of each shift register 26 to the first stage of the following shift register 26, this being illustrated by lead lines L1, L2, L3, down to L128. Additionally, conventional means would be provided to insure that each set, or block, of data supplied to shift registers 26 is complete and that the ordered position of each bit is accomplished, as by the use of parity checks or cyclic redundancy codes and the use of counting devices, such as ring counters or the like.

While the present invention is shown as having the row selector code scheme as being applied to memory 24 through AND gates 18, it is possible to those skilled in the art to apply the coded data from shift register 16 directly to memory 24, or other row selector code schemes may be devised involving more plaintext bits and more rows of matrix K. Importantly, the significant thing here is that the plaintext data is converted in a nonlinear manner to a serial, segmented row selector code wherein the number of bit positions in each segment corresponds to a like number of rows of an "n-let" (such as the aforementioned 4-let) of matrix K (or memory 24) with one bit in each segment selecting a single row of an "n-let" of matrix K that ultimately participates in the encryption process.

Additionally, in the above example, the row selector bits of the row selector code have been made to select rows with row identifiers identical to the plaintext bits in the row selector encoder process, but this is not required. Alternately, in the instance where it is desired to further "harden" the encryption scheme, the row selector bits may be arranged to select rows with "row identifiers" different from the plaintext bits, with an added step in the decryption process that translates the "row identifiers" back to selecting bit values. One example of this would include optional inverters (not shown) on some or all of outputs 30 of AND gates 18. These inverters reverse the logic states of the outputs of each of AND gates 18 to which they are connected, selecting incorrect rows of memory 24. In effect, this disguises the correct selection of rows 26 of memory 24 that are necessary to obtain a valid decryption. As stated, these misselected rows of memory 26 must be inverted back to their original logic states prior to decryption, by inverting selecting bit states in the decryption process.

In any case, memory 24 is loaded from any conventional media, such as a floppy disk, through an appropriate interface, such as buffer memory 32, with a singular, algebraic binary matrix K created by key K generator 31 and of dimension m×n wherein m>n. Matrix K serves as a single public key, which may be communicated over insecure communications channels and is the matrix product, or consolidation, of two private, or secret, key matrices T and M. Matrix M is an n×n randomly generated, nonsingular matrix used to disguise T, and whose algebraic inverxse $M^{-1}$ serves as one of two private keys. Matrix T, which serves as the second private key, is a specially-constructed m×n matrix identical in dimension to K and containing a series of smaller 4×2 submatrices disposed along its diagonal as follows:

| |
|---|
| 00............ |
| 01............ |
| 10............ |
| 11............ |
| ....00............ |
| ....01............ |
| ....10............ |
| ....11............ |
| ........00........ |
| ........01........ |
| ........10........ |

| |
|---|
| ........11........ |

These submatrices are each constructed of four row identifiers 00, 01, 10, and 11, each of which directly corresponds to the two-bit segment of plaintext which designates the particular row of the fourlet to be selected. These row identifiers are injected in disguised form into the ciphertext by the encryption process for the purpose of later identifying in the decryption process the rows of public key K participating in the generation of ciphertext. However, if left at this stage of development, the sparse and triangular form of matrix T, which has zeros above and below the diagonal, may yield a public key from which private key T or M could be derived. Accordingly, to eliminate the sparse triangular form of T, bit positions above and to the right of the diagonal are filled in with randomly generated "noise" bits, and bit positions below and to the left of the diagonal are filled with randomly generated "replacement" bits. The noise bits, in the preferred embodiment, are selected randomly because it is believed that an ordered selection of noise bits above and to the right of the diagonal may weaken the public key K, although an ordered selection of the noise bits is workable. An abbreviated example of a T matrix as described is as follows:

| |
|---|
| 00101101 |
| 01110010 |
| 10001110 |
| 11010011 |
| 10000111 |
| 10011011 |
| 10100101 |
| 10110100 |
| 01100010 |
| 01100111 |
| 01101001 |
| 01101110 |
| 11100000 |
| 11100001 |
| 11100010 |
| 11100011 |

It will be noted that the "replacement" bits to the left and below the diagonal are identical for each row of each submatrix but follow a pattern such that when columns of unique replacement values are added modulo-2, they will add up to zero, which assists in decryption, as will be explained. In the encryption process, the "replacement" bits are automatically eliminated, and the "noise" bits are removed, or deconvoluted, in the decryption process, as also will be described, allowing the row identifiers to be retrieved and applied to matrix T. The set of rows of the matrix T associated with each submatrix are also designated "n-lets," with these "n-lets" used herein, and, by way of example, being those rows associated with each 4×2 submatrix. This arrangement results in row groups of 4-lets, although other groupings may be used, such as 8×3 submatrices, which would result in row groups of 8-lets. In this variation, row selector encoder 14 would convert each three bits of plaintext to a code wherein 000=10000000, 001=01000000, 010=00100000, etc. and the described process followed. In any case, all rows of matrix T so disposed may be characterized by the sequence RxxN, where R designates the replacement bits, and N designates the noise bits, and xx designates an identifying submatrix row identifier value. Necessarily, the rows of the first or topmost N-let are of the form xxN, and the last or bottommost N-let is of the form Rxx.

Alternately, if believed necessary to further "harden" key K, instead of selecting values of the "replacement" bits such that their rows conveniently sum to zero when added modulo-2, the "replacement" bits may be randomly generated so that when added modulo-2, a nonzero value is produced. In this instance, this non-zero value is used as a removal value that may be utilized to remove the effect of the replacement bits by an extra step included in the decryption process, as also will be described. While matrix T has been shown constructed in two discrete steps, it is noted that T may be constructed in a variety of ways, such as by matrix addition and/or multiplication of several matrices or in combinations thereof. In this instance, all that is necessary is for the final matrix T to be composed of other transforms that are reversable so as to be capable of decryption.

As stated, matrix T is multiplied by private key M, which is a randomly generated nonsingular matrix, to create $K = T \times M$. As such, it is believed to be computationally unfeasible to attempt to derive either T or M from K, due to the large number of permutations of T and M, on the order of approximately $10^{2710}$ for a public key matrix K of 64 by 128 bits. As yet a further security measure, the rows of T may be randomly shuffled in two ways; a global shuffle wherein groups of n-lets are shuffled, and a local shuffle wherein rows within n-lets are shuffled. Likewise, the effects of shuffling, if incorporated, is removed in the decryption process.

Constructed as described, matrix K may be used as a public key to encrypt data and which may be transmitted over insecure communications channels, with only the bearers of the private keys T and M, which are multiplied to produce K, being capable of decrypting ciphertext produced by K. As stated, and referring to FIG. 1, memory 24 into which K is loaded is sized to accommodate matrix K, with matrix K loaded into the corresponding memory locations of memory 24. The output, or binary, state of each memory location of memory 24 is connected to one input of AND gates 32, one AND gate for each memory location, with the other inputs of rows of AND gates 32 connected to AND gates 18. In this manner, rows 33 of AND gates 32 are formed corresponding to rows of memory 24, each row 33 of AND gates 32 associated with a row 26 of memory locations, gates 32 being enabled by an enabling logic state of the output of AND gates 18. In this example, a "1" logic state on outputs of AND gates 18 is utilized as the enabling logic state.

In operation, for selecting rows of key K from memory 24 to participate in the encryption process, the output of each memory location of shift register 16, containing the nonlinear, encoded plaintext, is applied to one input of AND gates 18. These AND gates 18 are enabled simultaneously by the command logic signal from encode command control 20. Upon occurrence of this command signal, the logic states of discrete memory locations of shift register 16 are gated via leads 22 to enable AND gates 32, selecting rows of matrix K in accordance with positions of enabling bit states with respect to rows in memory 24 that will participate in the encryption process. It will be recalled that from every 4-let of matrix K, only one row will be selected in accordance with the coding of the row selector encoder process, this row being selected by virtue of the two-bit plaintext segment giving rise to a particular row selector code that correlates a row identifier in a particular submatrix of K with the two-bit plaintext segment.

It will be noted that for every fourlet, the output state of a discrete memory location of shift register 16 is employed to enable a particular row of AND gates 32. In this fashon, the state of any particular memory location of shift register 16 gates out a particular row of matrix K when the state of that memory location is at a "one" logic level. In instances where the state of a particular memory location of register 16 is a "zero," then that particular row of AND gates 32 coupled to this zero logic state is disabled, and the outputs of the disabled row of matrix K associated with that one of AND gates 18 remain at a "zero" logic state. Additionally, modulo-2 addition is described in conjunction with the preferred embodiment of this invention, but other modulo-N bases are possible with the matrix operations described herein, such as the octal-type coding described above.

The next step in the encryption process is to apply the logic states of columns of the enabled, or selected, rows of memory 24, one row for each 4-let to a plurality of EXCLUSIVE-OR (XOR) gates 34 each having 128 inputs, and one XOR gate per column in memory 24, making 64 XOR gates each with 128 inputs. XOR gates 34 effectively add the column outputs of key K in memory 24 modulo-2. Accordingly, all enabled outputs of AND gates 32 of memory 24 are fed columnwise to an XOR gate 34 of the set of XOR gates 35, one gate per column of memory 24. The resultant column oriented outputs of XQR gates 34 are applied in a like numbered order to the "set" terminals of memory locations of ciphertext output shift register 36, which is loaded in parallel by these outputs. Thus, there appears in shift register 36 a serial ciphertext consisting of a like number of binary logic states as the plaintext and are the modulo-2 sum of the logic states of selected rows of memory locations in memory 24. These binary states are read out in serial form from shift register 36 by simply applying clock pulses from clock signal generator 38 to the "shift" input of shift register 36, whereby the ciphertext is shifted out of shift register 36 in serial form. This ciphertext, as stated, is the modulo-2 sum of columns of selected rows of key matrix K, and is not an encryption of the original plaintext itself but rather of the nonlinear row selector code.

To this point, information flow is as follows. Binary plain text data from buffer memory 12 is input to row selector encoder 14, where each two-bit segment of the plaintext is converted to a four-bit row selector segment. These segments are serially loaded into a shift register 16, which holds, as a block of information, 32 segments in 128 binary memory locations of shift register 16. Each of these 128 outputs is coupled as one input to one of AND gates 18, with the other of the inputs of AND gates 18 coupled to encode command 20, which enables all of AND gates simultaneously. This provides the logic state of each memory location of shift register 16 as an enabling or disabling signal to rows of AND gates 32, which in turn provide logic states of one row of each fourlet of memory 24. Columns of the selected rows are then XORed, or added modulo-2, to provide 64 serial bits of ciphertext.

An abbreviated example of this process is as follows. A public key k, consisting of 16 rows and 8 columns of data, and constructed by multiplying private keys T and M, to be set forth henceforth, takes the form:

```
01101110
00010100
01100101
00000001
11100100
00100011
11000010
01010011
01011110
01010010
11000001
11010011
10110110
01101101
10101000
01110011
```

This key K would be loaded into an appropriately sized memory 24 from a buffer 32 as described, and an arbitrary plaintext of 01101100 is to be encrypted. The plaintext is applied to row selector encoder 14, which converts the plaintext, two bits at a time, to a block of data in accordance with the described format 00=1000, 01=0100, 10=0010, and 11=0001. Thus, the plaintext data becomes a block of data segments of the form:

```
01= 0100
10= 0010
11= 0001
00= 1000
``` which, when serially applied to the above key K, appears as such:

| row | segment | key K |
|---|---|---|
| 1 | 0 | 01101110 |
| *2 | 1 | 00010100 |
| 3 | 0 | 01100101 |
| 4 | 0 | 00000001 |
| 5 | 0 | 11100100 |
| 6 | 0 | 00100011 |
| *7 | 1 | 11000010 |
| 8 | 0 | 01010011 |
| 9 | 0 | 01011110 |
| 10 | 0 | 01010010 |
| 11 | 0 | 11000001 |
| *12 | 1 | 11010011 |
| *13 | 1 | 10110110 |
| 14 | 0 | 01101101 |
| 15 | 0 | 10101000 |
| 16 | 0 | 01110011 |

Thus, it is seen that rows 2, 7, 12, and 13, denoted by a *, or one row from each fourlet of key K, is selected to have columns therefrom added modulo-2, or exclusive-ORed, which appears as such:

| row | key K |
|---|---|
| 2 | 00010100 |
| 7 | 11000010 |
| 12 | 11010011 |
| 13 | 10110110 |
| modulo-2 result | 10110011 |

The modulo-2 result is the ciphertext, from which the original plaintext data of 01101100 cannot be derived without the decryption tool.

Figure 2:
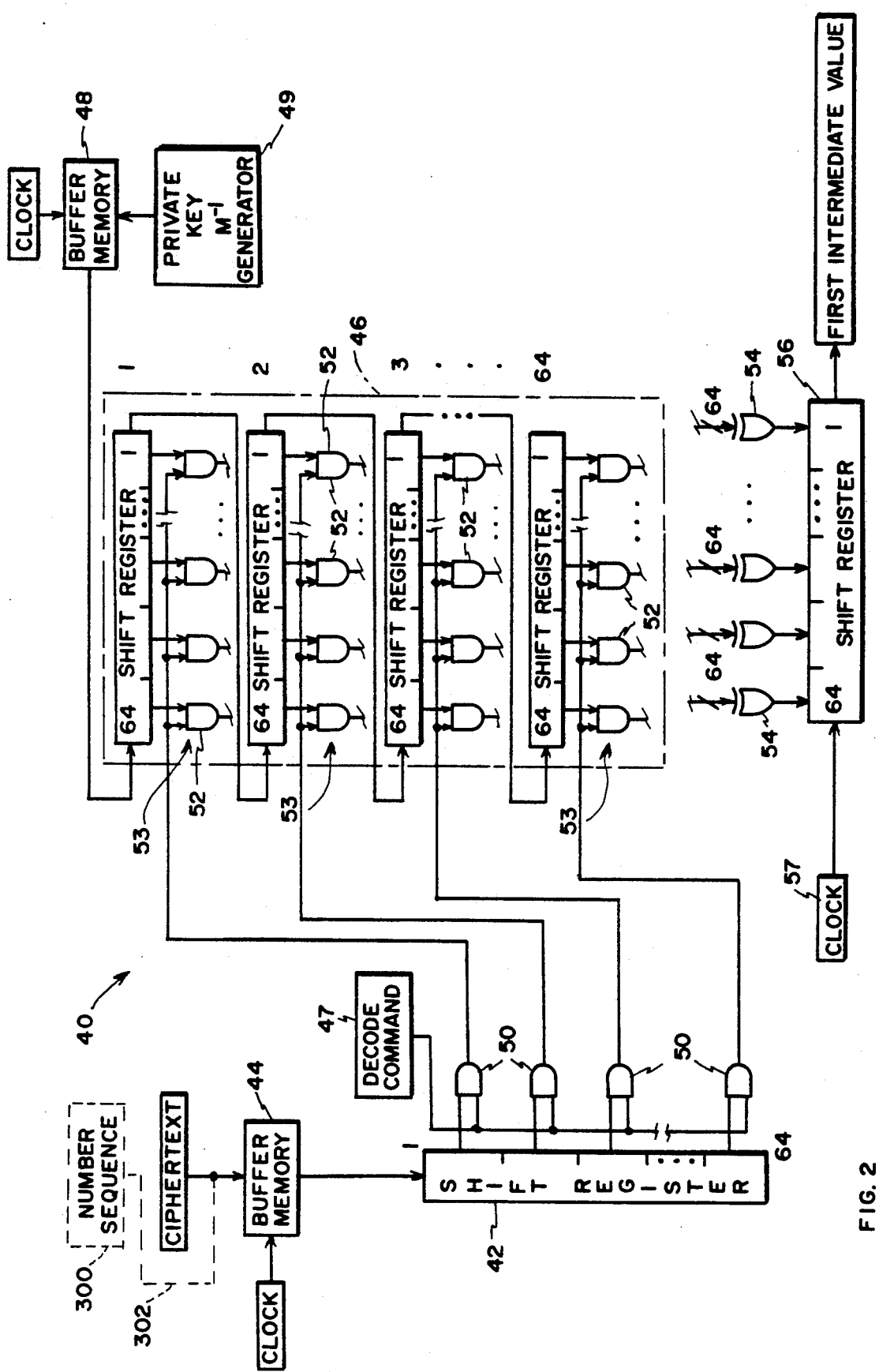
FIG. 2 is a schematic representation of a first part of decryption module.

Referring now to FIG. 2, which illustrates a first portion of the decryption scheme, it is seen that circuitry 40 for decryption bears similarities to the encryption scheme. Initially, the ciphertext block of data is serially applied, 64 bits at a time, to an input shift register 42 via an interfacing buffer memory 44. Here, in a like manner as the encryption circuitry, logic states of discrete memory locations of shift register 42, or the bit states of the ciphertext, are utilized to select particular rows of a memory 46 loaded with the first private key matrix $M^{-1}$ from a buffer memory 48. This selection, in essence, removes the effect of the multiplication of $T \times M$ from the encrypted data, with the data at this point appearing as though it was encrypted as described using matrix T.

As described for FIG. 1, discrete memory locations of shift register 42 are applied to one input of AND gates 50, one gate for each memory location, with an enabling input from decode command 47 coupled to the other input of AND gates 50. The output of AND gates 50 are coupled to one input of rows 53 of AND gates 52, with the other input of gates 52 coupled to one of memory locations of memory 46. Memory 46 is also configured in rows and columns sized to matrix $M^{-1}$ and serially loaded as described for FIG. 1 from buffer memory 48 with the private decryption key $M^{-1}$ generated from key generator 49, matrix $M^{-1}$ being a 64-by-64 bit matrix and the inverse of matrix M. Outputs of columns of AND gates 52 are coupled to XOR gates 54, one XOR gate per column of memory 46, with outputs of gates 54 coupled to "set" inputs of memory locations of shift register 56. As with the encryption circuitry, this process selects rows of memory 46 and thus rows of key $M^{-1}$ loaded therein in order to add columns of the selected rows of key $M^{-1}$ modulo-2. This addition occurs in XOR gates 54, with the result loaded in parallel into shift register 56. This data, which is a first intermediate block or data, is clocked out of shift register 56 by clock pulses from clock pulse generator 57 applied to the "shift" input of shift register 56 and, due to the now-reversed inverse relationship between key K and key M, appears as though the plaintext had been encrypted solely by matrix T, as stated in the foregoing.

To illustrate, and referring to FIG. 2, the binary ciphertext 10110011 of the abbreviated example, and encrypted as described above, is loaded into an appropriately sized shift register 42. Memory 46, also appropriately sized, is loaded with private key $M^{-1}$, and columns of selected rows denoted by *, which are rows enabled by a binary "1" of the ciphertext, are added modulo-2 as follows:

| row | ciphertext | key $M^{-1}$ |
|---|---|---|
| *1 | 1 | 11011010 |
| 2 | 0 | 01100000 |
| *3 | 1 | 01010111 |
| *4 | 1 | 00011000 |
| 5 | 0 | 01101111 |
| 6 | 0 | 01101010 |
| *7 | 1 | 00011111 |
| *8 | 1 | 11010011 |
| modulo-2 result | | 01011001 |

The modulo-2 result of rows 1, 3, 4, 7, and 8, or 01011001, is the intermediate value and must be further deconvoluted using the second private key matrix T which, as will be recalled, is based on submatrices constructed of row identifiers, with the submatrices disposed along a diagonal of matrix T and the row identifiers in the ciphertext disguised by the inclusion of the noise bits and replacement bits as described above. In this process, the information in private key T is utilized in order to "unmask" these row identifiers in the ciphertext by an iterative process that eliminates the perturbations caused by the noise bits above and to the right of the diagonal of submatrices in matrix T. Once the rows of K producing a ciphertext are known, the inverse of the row selection process for matrix K and implemented by encryption can be performed to produce the plaintext.

In the alternate embodiments described above wherein the replacement bits were selected randomly to not conveniently add up to zero, an extra step is necessary to remove the effects of the replacement bits. This step is illustrated in FIG. 2a and involves adding the 62 columns 51 in memory 60 containing the T matrix replacement bits modulo-2 in XOR gate 49 to produce a removal value 53. Gate 49 has 62 inputs corresponding to the 62 columns of replacement bits and 62 outputs for the modulo-2 sum. This removal value 53 is then added modulo-2 in XOR gate 55, with the first intermediate value 57 stored in memory 56 (FIG. 2) to produce a first true intermediate value 59 containing the first two most significant plaintext bits and a row identifier of the first fourlet of matrix T. As stated, FIG. 3 illustrates removal of the replacement bits by simply not allowing them to participate in the decryption process, which is believed to be equivalent to any process for removing them.

Figure 3:
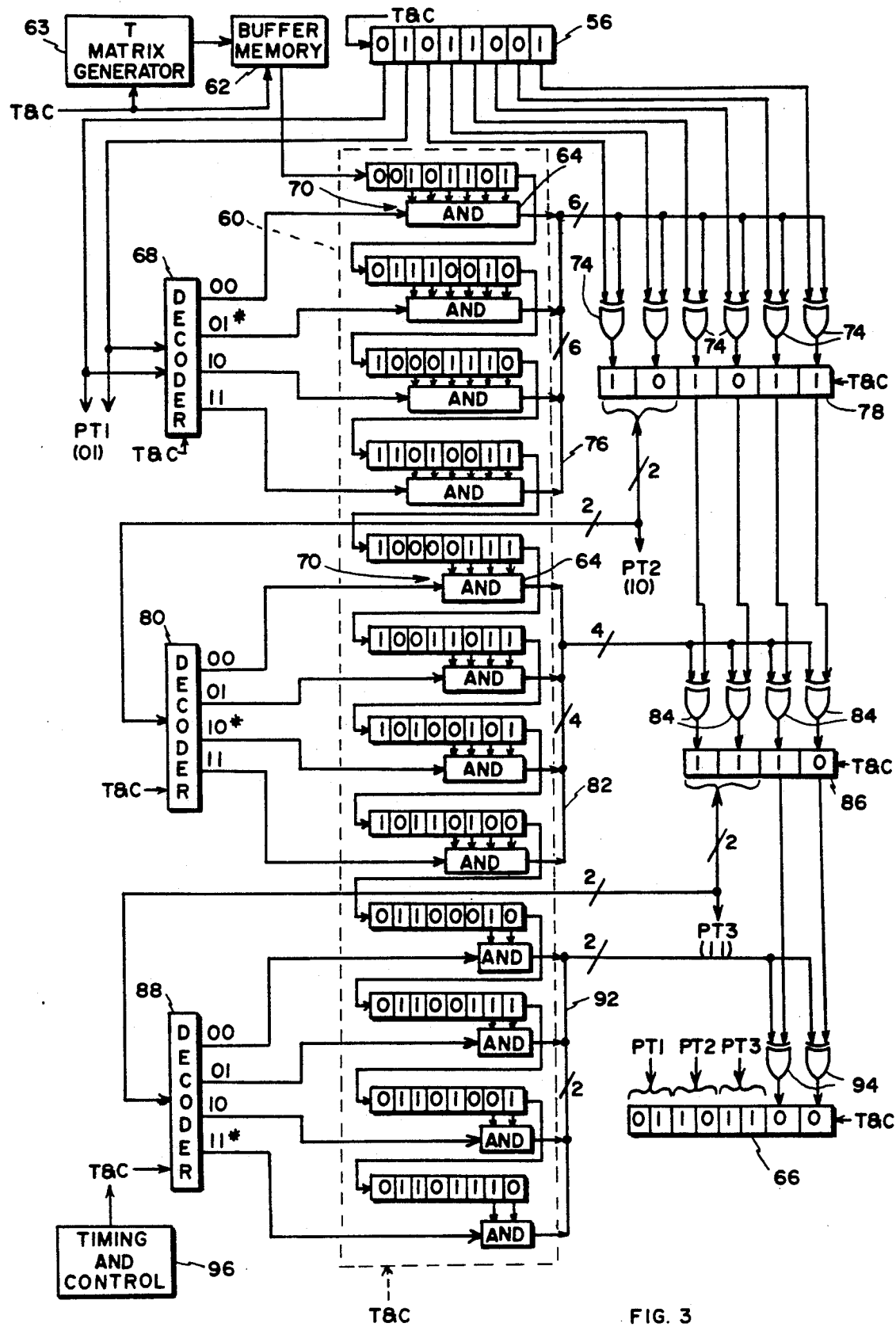
FIG. 3 is a schematic representation of a second part of the decryption module for the removal of noise bits (deconvolution) of the present invention.

The last step of utilizing the T matrix to deconvolute the perturbations caused by the noise bits is illustrated in FIG. 3. Here, a memory 60 is loaded from a buffer memory 62, in turn loaded from conventional media, such as a floppy disk, with the private key matrix T from key generator 63. Memory 60 is configured in rows corresponding to rows of matrix T, with rows 70 of AND gates 64 coupled to discrete memory segments of rows of memory 60. It will be noted that for each fourlet of rows of memory 60, successive two-bit segments, beginning with the two most significant bit positions of memory 60, are not coupled to rows of AND gates 64, as will be explained.

Memory 60 is sized to have an identical number of memory locations as matrix T, or 128 rows of 64 bits, as shown in memory 24 of FIG. 1. However, for consideration of space, the abbreviated example described above will be examined to illustrate the final iterative decryption process. In this process, the two most significant bits 01 of the first intermediate block 01011001 in shift register 56 (FIG. 2) are the two most significant bits of the plaintext, labeled PT1 in FIG. 3 and are loaded into the most significant bit locations of output buffer memory 66, from which the plaintext is read. Additionally, these first two plaintext bit states 01 are a row identifier for the first fourlet of matrix T and are applied to a decoder 68, which provides an enabling logic state, such as a binary 1, on one of four outputs 00, 01, 10, or 11, in this case 01, responsive to the logic states of PT1. These outputs are coupled to one input of AND gates 64, which are configured in rows 70, but for space considerations are shown as a single block. The outputs of discrete memory locations of rows of memory 60 are coupled as shown to discrete other inputs of rows 70 of AND gates 64. Connected as such, decoder 68 gates logic states of the selected row, in this case row 01, via a parallel bus 76, to one input of XOR gates 74. Only the six least significant bits are coupled to gates 74 because when T was created, there were no disguising noise bits above the first submatrix to introduce perturbations that need be deconvoluted in this final decryption process. Thus, FIG. 3 shows only 6 bits from the rows of the first fourlet of memory 60 coupled to the rows 70 of AND gates 64, these connections representing removal of the masking effect of the noise bits. Additionally, since memory locations not connected to AND gates 64 are equivalent to a zero logic state, the scheme of FIG. 3 may be modified by coupling AND gates to every memory location of memory 60 and loading these memory locations shown not connected with zero logic states, eliminating the noise bits.

The other inputs to XOR gates 74 are provided via bus 76 by the remainder of the memory locations of buffer memory 56 and consist of the six least significant bits of the first intermediate block. XOR gates 74 effect the modulo-2 addition of the portion of the selected row of the first fourlet of memory 60 (the second row of matrix T) and the six least significant bits of the first intermediate block in buffer 56. The result of this addition is stored in buffer memory 78, with the two most significant bits of this addition, 10, and labeled PT2, being the second most significant two bits of the deciphered plaintext which ar stored in buffer 66 and also contain the next row identifier. This next row identifier, 10, is applied to a second decoder 80 identical to and coupled in a like manner as decoder 68. Decoder 80 decodes the 10 to provide an enabling output on the output line 10, selecting the four least significant bits of the third row of the second fourlet, which are applied in parallel via bus 82 to one of the inputs of XOR gates 84. As described, only the four least significant bits of the second fourlet are utilized to effect removal of the noise bits. The other inputs of XOR gates 84 are supplied by the four least significant bits of buffer memory 78 containing the outputs of the four least significant bits of XOR gates 74. The result of this latter modulo-2 addition is stored in buffer memory 86, with the two most significant bits of this addition provided to a third decoder 88, and also forming the next two most significant bits of plaintext, labeled PT3, and stored in buffer memory 66. Decoder 88 decodes the row identifier in PT3 and provides an enabling output on decoder line 11 to the last row of the third fourlet, where the two least significant bits are provided as outputs on bus 92. As before, these outputs are applied to one of each input of XOR gates 94, with the other inputs of XOR gates 94 provided by the output of buffer memory 86 containing outputs of XOR gates 84. The results of this last modulo-2 addition directly yield the last two least significant bits of plaintext data, PT4, without decrypting the last fourlet because there are no noise bits to the right of the last submatrix. It is to be noted that in this iterative process, PT1, PT2, and PT3 are not involved in the modulo-2 addition of XOR gates 74, 84, and 94. Additionally, timing and control, designated T&C, of the various components of FIG. 3 are effected by conventional timing and control 96, which in general would be a microprocessor and ancillary components conventionally programmed.

In the other embodiment described above wherein the row selector bits from AND gates 18 are inverted by inverters, the sxtranslation of these row selector bits back to selecting bit values is effected by locating the inverters (not shown) on selected lines from decoders 68, 80, and 88 or on selected inputs to these decoders, as would be appropriate. These inverters would invert misselected rows of K back to the properly selected rows of matrix T.

Several usages of the cryptosystem of the present invention will now be described. First, and as shown in FIG. 4 by way of example, a unidirectional, or simplex, communications system capable of one-way communication, digital signature, and IFF (identification friend or foe) purposes is constructed wherein party A may possess only a public key 100 and an encryption module 102. Party B may possess only a decryption module 104 and the private keys $M^{-1}$ and T 106 for the public key held by A. In this application, it is assumed that A wishes to confirm the identity of B by being assured that B is the holder of the private keys. Using the public key of B, A encrypts a secret password known only to him, for example, the password INIGO JONES, and transmits the ciphertext to B. If B can produce the subject password, he proves that he is indeed the holder of the private keys 106. B does this by first decrypting the ciphertext with his private keys, obtaining the password INIGO JONES. B then submits the password INIGO JONES to his decryption module and transmits the resulting ciphertext back to A. When A decrypts the ciphertext with the public key of B, the password INIGO JONES is produced, proving that B is the holder of the private keys. This example illustrates the asymmetrical properties between the public key and the private keys, which properties may be exploited to perform cryptographic transforms in either direction. Additionally, the public and private keys may be generated and changed quickly, on the order of seconds, adding to the difficulties of a hostile party attempting to "crack" the public key.

For implementing simple duplex communications, FIG. 5 illustrates a system wherein parties A and B each hold encryption and decryption modules 110 and 112, respectively, with the public key of B loaded into the encryption module of A, and the public key of A loaded into the encryption module of B. In this situation, and assuming that a message is to be sent from party A to party B, A applies the message to his encryption module 110, where it is encrypted to ciphertext by the public key of B. The ciphertext is then sent to B, who applies the ciphertext to his decryption module 112 and receives the plaintext out. For communications in the opposite direction, B communicates with A in a like manner. This system may be used for digital signature purposes by either party A or party B, a first party, inputting a signature statement to his decryption module 112, obtaining a ciphertext of the signature, and transmitting the ciphertext to the second party. The second party then applies the ciphertext of the signature to his encryption module 110 and obtains the plaintext signature out. The reply to this plaintext signature may then be transmitted back to the first party.

Figure 6:
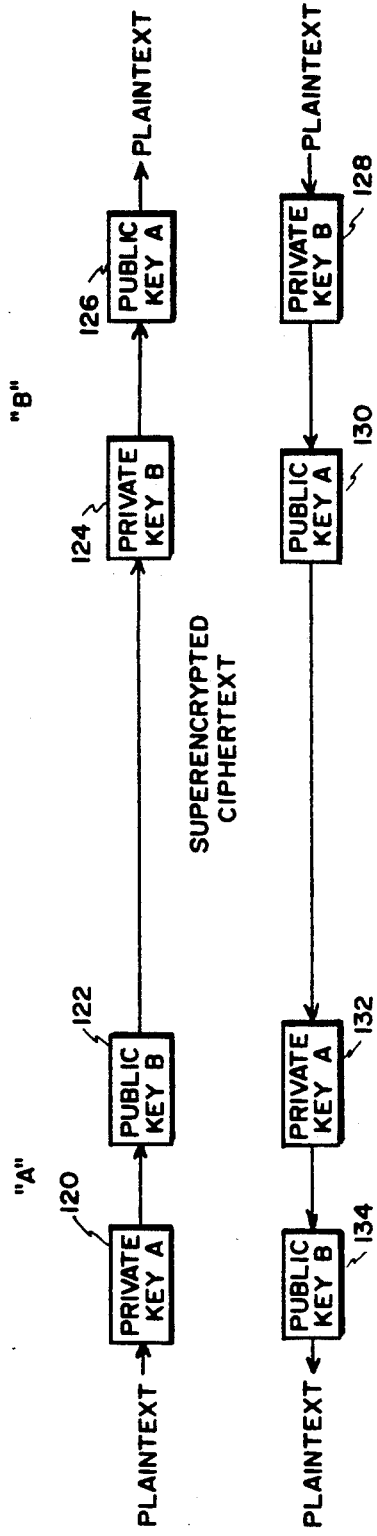
FIG. 6 is a diagrammatic illustration of a duplex communications scheme with superencryption utilizing the present invention.

For adding to the security of the described duplex system, FIG. 6 illustrates a duplex system combined with superencryption, this combining the functions of encryption/decryption with digital signature creation/verification. Here, for superencrypting plaintext data and sending this data from A to B, party A possesses a decryption module 120 containing private keys for the corresponding public key K of A, with this decryption module coupled to an encryption module 122 containing the public key K of B. For decrypting the message from A, B possesses a decryption module 124 containing private keys for the corresponding public key of B held by A, module 124 coupled to an encryption module 126 containing the public key of A. For sending a message the other direction, from B to A, B possesses a decryption module 128 containing private keys of B and coupled to an encryption module 130 containing the public key of A. A possesses an encryption module 132 containing private keys of A, with module 132 coupled to a decryption module 134 containing the public key of B. Assuming that A wishes to send a message to B, A applies a binary plaintext version thereof to his decryption module 120 and obtains a first ciphertext transformed by the private keys of A, which ciphertext is then applied to the encryption module 122 of A containing B's public key to obtain a second ciphertext. This second, superencrypted ciphertext is transmitted to B, who applies it first to decryption module 124 to obtain the first partly decrypted ciphertext, which is then applied to the encryption module 126 containing A's public key, resulting in the plaintext data out. Communications occurring in the other direction are operated upon in the same manner. Thus, it is noted in this example that all that is necessary to enable bidirectional, superencrypted communications between A and B is for A and B to exchange public keys. Further, in these examples, the terms encryption module and decryption module are only used as reference points, with the modules containing the public and private keys each capable of performing nonlinear, asymmetrical cryptographic transforms.

Figure 7:
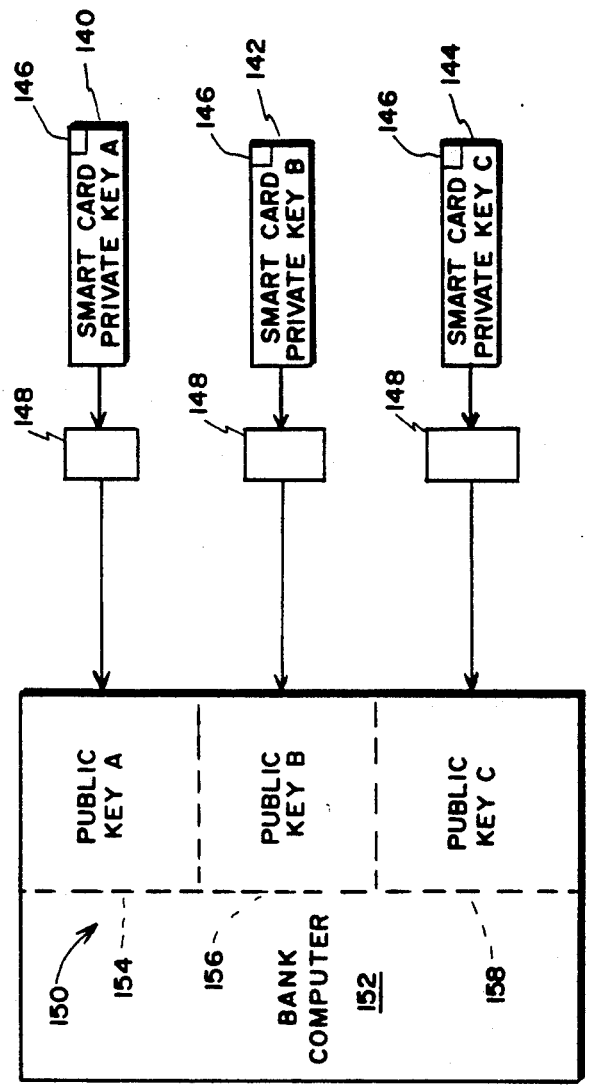
FIG. 7 is a diagrammatic illustration of a communications scheme for a "smart card" system utilizing the present invention.

Lastly, a system is shown in FIG. 7 for incorporating decryption modules containing private keys into a "smart card" system such as that manufactured by Siemans AG, located in Munich, Germany, or Machine Bull, of Paris, France. In this system, the individual "smart cards" 140, 142, and 144 each contain a discrete microcomputer 146, with software therein configured to provide, in this example, a decryption system and a unique private key in each card. These cards typically are plugged into a remote terminal 148 that communicates with the central computer 150 via an insecure communications channel, such as the telephone lines. The corresponding public key for each card is held by a computer 150 in a centralized location 152, such as in a bank. This computer 150 would be provided with encryption modules 154, 156, and 158 for each of the "smart cards" 140, 142, and 144. In this scheme, plaintext data would be input by the card holder to the cards where it undergoes a cryptographic transform to ciphertext, with the ciphertext transmitted to the bank computer 150 where the data is transformed back to plaintext and verified by encryption modules 154, 156, and 158.

Additionally, in yet another embodiment, the decryption module may be used as a random number generator, as shown in FIG. 2. Here, any sequence of ordered or nonordered numbers of the requisite bit length stored in serial manner in shift register 300 (dashed lines) may be submitted to buffer memory 44 via lead 302 (dashed lines). A cryptographic transform is then effected as described to obtain a random number set in register 66 of FIG. 3. If desired, this random set of numbers may be verified as being derived from the original sequence of numbers by applying the random set of numbers to the encryption module to obtain the original random numbers.

It is to be emphasized that a major achievement of this invention is its relative speed in effecting reversible nonlinear transformations of binary text. During encryption, in the software version, only two AND and one XOR operations per input bit are required for producing ciphertext, while decryption is approximately three times slower due to the iterative process involved; nevertheless, it is believed that the present invention, implemented in hardware form, is capable of encryptions and decryptions at color television IF frequencies, or about 30 mHz.

Turning now to a software embodiment for implementing the cryptosystem as described above, which software is capable of being "run" on a PC-type machine using an MS-DOS (TM) operating system or equivalent, reference is made to the microfiche appendix. Here, a heavily annotated source code program written in C++ (TM) language, as set forth in The C++ Programming Language by Bjorne Stroustrup and published by Addison Wesley, is shown for generating the various sets of cryptographic keys required for encrypting and decrypting a plurality of sample, arbitrary plaintext blocks in lengths of 4, 6, 8, 16, 32, 64 and 76 bits, although larger block sizes are possible. It is to be noted that while only one software and hardware embodiment is disclosed herein, numerous embodiments, particularly in software form, may be devised utilizing the principles of the present invention and without departing from the scope of the appended claims following this disclosure.

Initially, the singular matrix T with row identifier submatrices along a diagonal thereof and randomly generated noise bits above and to the right of the diagonal is created by the function "generate_T_with_noise". Matrix T is further disguised by inclusion of replacement bits as described above by the function "generate_replacement_rows," which randomly generates the rows of replacement bits. The function "add_matrix_matrix," which adds replacement row values modulo-2 to matrix T, creating the matrix "key_T_replaced_matrix". The rows of this matrix are then randomly jumbled, four rows at a time, by the function "jumble_row_groups_of_matrix". A nonsingular binary matrix M and its inverse $M^{-1}$ is randomly generated by function "make_pair". The inverse property is verified by multiplying M by $M^{-1}$ to insure that the identity matrix I is produced. Matrix T is then multiplied by matrix M by the function "multiple_matrix_matrix" to create the public key K ("public_key_K") which, as described, is a highly disguised form of matrix T. As a result of the above stepwise generation of public key K, and because of its singularly, it is believed to be computationally unfeasible to derive private key matrix T or M from the public key K.

The initial step of encryption begins with a block of binary plaintext being expanded in a nonlinear manner, as described above, by the function "expand_text". This produces the row selector code "expanded_text," and the plaintext so expanded is utilized by the function "multiply_vector_matrix" to select rows of public key K and add them modulo-2 to produce the ciphertext "encrypted_text." This ciphertext is then applied by the aforementioned function "multiply_vector_matrix" (with different input and output parameters) in the decryption module which contains the private key $M^{-1}$, constructed as described. Accordingly, rows of matrix $M^{-1}$ are selected by the ciphertext to participate in the decryption process by the function "multiply_vector_matrix" which, in like manner, adds the selected rows modulo-2 producing "intermediate_text." This step "unmasks" the first two plaintext bits occupying the most significant positions of the intermediate value, which bit pair is also seen to be a row identifier allowing it to be used to select the correct row of private key T to participate in the iterative deconvoluting process of decryption. This first row identifier, as noted, is utilized by the function "deconvolute_text" to select a row of private key matrix T to be added modulo-2 to the intermediate text by the function "remove_T_row_noise," modifying the intermediate value. This step "unmasks" the next row identifier value, allowing its use as a parameter for the function "deconvolute_text." The function "remove_T_row_noise," which selects and adds the next selected row of matrix T modulo-2 with the intermediate value, produces a resultant block having the next two plaintext bits and the next row identifier in the most significant bit positions of the intermediate value. The foregoing process is repeated iteratively by the function "deconvolute_text" to recover plaintext bits left to right and two at a time until all the plaintext bits have been recovered although, at this stage, the plaintext bits are disposed in jumbled or transposed positions. The final function "unjumble" rearranges the bits of the plaintext in correct order by performing the inverse of the original jumbling process accomplished during encryption by public key K, which was jumbled in a predetermined manner upon key generation by the function "jumble_row_groups_of_matrix" as already noted to produce a random jumbling of two-bit segments of all output plaintext.

Alternately, one might construct a m×n public key K where the ratio of m:n is 3:2 and where n is also a multiple of six. In this version, the upper third of K would be populated by a nonsingular submatrix A of dimension $\frac{1}{3}n \times \frac{1}{3}n$ where the columns of A are replicated three at a time across the top of K. The remaining square portion of K below would be filled with 3×3 submatrices containing row identifiers disposed along the diagonal in the manner described in the foregoing paragraphs. In this case, however, row identifiers are chosen so that the complement of any one row identifier is not equal to another row identifier.

Plaintext blocks P of length n would be expanded to length m by the following process. The high-order half P1 of P would be left intact while the low-order half P2 would be expanded into a row selector code with each two-bit portion of P2 transformed into a row selector code as follows: 00-010, 01-100, 10-000, and 11- 001. Rows of K would then be selected by the row selector code and added modulo-2 to produce ciphertext C of length n.

In the decryption process, row identifiers would be recovered as already noted with the following exception. Each unique row identifier or its corresponding unique complement would identify the row selector code. A typical set of row identifier codes having this property are: 011, 110, and 101. If a row identifier is recovered unchanged, the columns of the A portion of K above it furnish a 000; otherwise, the rows of A furnish a 111, complementing the row identifier. However, if a 000 or a 111 value is obtained, no row identifier is selected. In this manner, the bits of P2 are determined. The bits of P1 are determined in a different manner by first assembling the bits produced by each column of A identified as noted above and inverting these by multiplying them by $A^{-1}$ to produce the selecting bits of P1.

A simple example described below illustrates how the method of the present invention can be implemented via transforming integers instead of transforming matrices. Initially, let transforms T and M be represented by discrete transforming integers T and M where T=102030102 and M=9. The consolidated transform K' is formed as the quotient K'=T/M=11336678. To conceal or encrypt the digital signals, or plaintext example P'=123, P' is initially transformed to a representation R, which is analogous to the nonlinear transformation of the plaintext to row selector code as described above by a nonlinear expansion method of left zero insertion such that P'=123 is transformed to R=010203. Next, R is multiplied by K' to create the product 00015668125634 from which the high-order half is truncated to create the final concealed or ciphertext version C'=8125634 or the original value P'=123. The high-order portion is truncated for convenience, and is not necessary.

To reveal R, and thereby P', the concealed value C' is multiplied by transform M to create the intermediate value 73130706, which intermediate value is seen to be the same value as if R had originally been multiplied by T instead of K'. It is noted that the two low-order digits of this product are '06'. Since the low-order digit pair of T is the known value '02', it is seen that the two low-order digits of R can be derived by 06/02=03, which division is the inverse of the original multiplication process. To reveal the next two digits of R, 03×T=306090306 is computed and this value subtracted from the intermediate result, which gives *67040400, thereby revealing the next low-order pair of R as '04xx'. In like manner, 0400/2x0100=02xx is computed, which is seen to be the second pair of low order digits of R. To reveal the next two digits of R, 0200×T=20406020400 is computed, and this value is subtracted from the intermediate result, which gives 20441020000. In the same way, 020000/(1×20000)=1 which is seen to be the third pair of the low-order digits of R. The successive values (01, 02, 03) resulting from the above process are concatenated without leading zeroes and are seen to comprise the original value of P'=123.

Having thus described our new block encryption and decryption and digital signature apparatus and method and the manner of its use, it is apparent that incidental modifications may be made thereto that fairly fall within the scope of the following appended claims.

What is claimed is:

1. A method for generating a cryptographic key and encrypting a sequence of data therewith comprising the steps of:
    (1) generating a first key including a nonsingular square matrix of digits arranged in rows and columns;
    (2) generating a second key including a rectangular matrix of digits arranged in rows and columns wherein each of said rows of said rectangular matrix contains a plurality of digits, at least two of said last named digits are of a first category comprising row identifier digits coded for identifying, in the rectangular matrix, particular rows for selection to participate in a decryption process, and a remainder of said digits in each said row are of a second category; and
    (3) multiplying said rectangular and said nonsingular matrices to form a third, rectangular key matrix, said key matrix arranged in rows and columns of digits, with each said row of digits of said key matrix including said row identifier digits,
    (4) selecting discrete said rows of said third key matrix in accordance with particular configurations of discrete segments of a sequence of data to be encrypted; and
    (5) adding said selected rows of said key matrix, modulo-2, to produce an output data sequence having said sequence of data and said row identifier digits encrypted therein.

2. A method for decrypting said output data sequence encrypted by the method of claim 1 comprising the steps of:
    (1) generating said inverse matrix to said nonsingular square matrix,
    (2) selecting rows of said inverse matrix in accordance with digit positions of a particular logic state in said output data sequence of encrypted data;
    (3) adding selected said rows from said inverse matrix modulo-2 to produce a first intermediate block of data containing a first portion of said sequence of data and a first set of said row identifier digits;
    (4) utilizing said first set of row identifier digits to select a first row of the rectangular matrix of digits;
    (5) beginning with said first intermediate block of data and said first row of said rectangular matrix selected by said first set of row identifier digits, adding said first intermediate block of data, exclusive of said first set of row identifier digits and said first portion of said sequence of data, modulo-2, to said first row of the rectangular matrix selected by said first set of row identifier digits to obtain a second intermediate block of data, a second set of row identifier digits and a second portion of a said sequence of data;
    (6) continuing to obtain successive portions of said sequence of data and successive sets of said row identifier digits in successive intermediate blocks of data obtained by modulo-2 addition of selected rows of the rectangular matrix with portions of intermediate blocks wherein a portion of a discrete said intermediate block of data is added modulo-2 to a row of the rectangular matrix selected by a set of said row identifier digits in said discrete intermediate block of data, until the sequence of data is recovered.

3. A method as set forth in claim 2 wherein said rectangular matrix, said nonsingular matrix, and said inverse matrix are binary matrices.

4. A method as set forth in claim 2 wherein a digital signature can be created by a holder of the inverse matrix and the rectangular matrix, said signature verifiable by a holder of the key matrix, and further comprising the steps of:
    (1) creating a digital signature value by encrypting said data sequence being representative of a desired said digital signature by said decryption method to create a ciphertext representation of the digital signature; and
    (2) verifying said digital signature by transforming said ciphertext representation by said encryption method back into the data sequence representation of the digital signature, whereby said verification process establishes a source of said data sequence representation as the holder of the singular and inverse matrices.

5. A method as set forth in claim 4 wherein said method of digital signature creation and verification is combined with said methods of encryption and decryption in a method of duplex communication exercised between a pair of correspondents by encryption method comprising the steps of:
    (1) each correspondent independently generating a said inverse matrix, said rectangular matrix and said key matrix, and each correspondent exchanging respective said key matrices with the other of said correspondents while retaining respective said inverse matrices and said rectangular matrices;

(2) each correspondent encrypting said sequence of data by respective said inverse matrices and said rectangular matrices to produce ciphertext which is further encrypted by the other correspondent's key matrix to create doubly encrypted ciphertext which is transmitted to the other correspondent;

(3) each said correspondent decrypting said doubly encrypted ciphertext by respective said inverse matrices and said singular matrices to produce intermediate ciphertext; and (4) each said correspondent decrypting said intermediate ciphertext by said encryption method utilizing the other correspondent's key matrix.

6. A method as set forth in claim 1 wherein said step of selecting discrete said rows of said key matrix in accordance with particular configurations of discrete segments of said sequence of data includes converting said sequence of data in a nonlinear manner to a representative block of data and multiplying said representative block of data modulo-2 as a row vector by said key matrix to produce said output data sequence.

7. A method as set forth in claim 6 wherein said row identifier digits are disposed in said rectangular matrix as smaller, rectangular submatrices of dimension m×n, where m is greater than n.

8. A method as set forth in claim 7 wherein values of said row identifier digits in each said submatrix are unique.

9. A method as set forth in claim 8 wherein values of said submatrices and row identifier digits are constructed of rows and columns of digits wherein a first row comprises binary digits 00, a second row comprises binary digits 01, a third row comprises binary digits 10, and a fourth row comprises binary digits 11.

10. A method as set forth in claim 7 wherein said digits of said second category disposed to right and left sides of said diagonal are pseudorandom logic states such that when said first and second matrices are multiplied, said row identifier digits are imbedded in a rectangular matrix of said second category digits.

11. A method as set forth in claim 7 wherein said digits of said second category disposed below and to the left side of said diagonal are ordered such that a modulo-2 addition of columns of said digits of said second category below and to a left side of said diagonal equals zero.

12. A method as set forth in claim 11 wherein said modulo-2 addition is performed by adding a fixed replacement row value to each said row associated with each said submatrix in said singular matrix but where the fixed replacement row value so added differs for each set of submatrix rows.

13. A method as set forth in claim 7 wherein said output data sequence comprises encoding said sequence of data into an expanded, nonlinear row selector code representative of said sequence of data wherein positions of digits which select rows of said key matrix are a function of positions of said row identifier digits of said submatrices in said rectangular matrix.

14. A method as set forth in claim 1 for decrypting said output data sequence further comprising the steps of:

(1) multiplying the output data sequence as a row vector by said inverse matrix to create said first intermediate block of data wherein at least two most significant bits thereof are a recovered first portion of said sequence of data and a first said row identifier; and (2) utilizing said first row identifier to select a portion of a first row of said rectangular matrix;

(3) adding modulo-2 said portion of said first row with said first intermediate block to produce a second intermediate block wherein two most significant digits thereof are a recovered second portion of said sequence of data and a second row identifier;

(4) utilizing said second row identifier to select at least a portion of a second row of said rectangular matrix;

(5) adding modulo-2 said portion of said second row with said second intermediate block to produce a third intermediate block wherein two most significant digits thereof are a recovered third portion of said sequence of data and a third row identifier;

(6) iteratively repeating the steps of adding modulo-2 selected portions of said rows with prior-formed intermediate blocks to produce intermediate blocks wherein two most significant digits thereof are recovered portions of said sequence of data and row identifiers for selecting next rows of the rectangular matrix, until said sequence of data is recovered.

15. A method as set forth in claim 14 wherein pseudorandom numbers and number sequences are generated by transforming a designated set of numbers by the decryption method to create an output set of pseudorandom numbers and where said output set can be verified as issuing from said designated set of numbers by submitting said pseudorandom numbers to the encryption method to create and verify said designated set.

16. A method for encrypting and decrypting binary plaintext comprising the steps of:

(1) generating a single, rectangular binary matrix K for use as a public key and having row identifiers encoded in discrete segments therein, said matrix K generated by multiplying a rectangular matrix T having the row identifiers embedded therein by a non-singular binary matrix M having an inverse $M^{-1}$, said matrix T and said matrix $M^{-1}$ utilized as private keys;

(2) coding binary plaintext into a nonlinear row selector code wherein digits of a particular logic state are row selector digits;

(3) encrypting a block of binary plaintext data by selecting discrete rows of said matrix K with said row selector digits;

(4) adding discrete first digits of columns of said rows selected by said selecting digits modulo-2 to produce a block of binary ciphertext;

(5) decrypting said binary ciphertext by selecting rows of said matrix $M^{-1}$ by particular bit states of said ciphertext;

(6) adding discrete second digits of said selected rows of said matrix $M^{-1}$ modulo-2, producing a first intermediate block of ciphertext wherein at least two most significant bits are a first set of the binary plaintext data and which also contains a first said row identifier;

(7) utilizing said first row identifier to select at least a portion of a first row of said matrix T;

(8) adding modulo-2 said portion of said first row of said matrix T with said first intermediate block to produce a second intermediate block containing a second set of said binary plaintext data, the second set containing a second said row identifier therein;

(9) utilizing said second row identifier to select at least a portion of a second row of said matrix T;

(10) adding modulo-2 said portion of said second row of said matrix T with said second intermediate block to produce a third intermediate block containing a third set of said binary plaintext data, the third set containing a third said row identifier therein; and

(11) successively repeating steps (9) and (10) for N number, where N is a positive integer, of said rows of matrix T, corresponding said row identifiers and said intermediate blocks until the binary plaintext is recovered.

17. A method as set forth in claim 16 wherein said row identifiers and said segments comprise row identifier submatrices disposed along a diagonal of said matrix T.

18. A method as set forth in claim 17 wherein bit locations above and to a right side of said diagonal are filled with pseudorandom, noise logic states, and bit locations below and to a left side of said diagonal are filled with replacement logic states such that columns of said replacement logic states, when added modulo-2, result in a zero logic state.

19. A method as set forth in claim 16 wherein said row identifier submatrices each comprises a matrix wherein a first row comprises binary digits 00, a second row comprises binary digits 01, a third row comprises binary digits 10, and a fourth row comprises binary digits 11.

20. A method as set forth in claim 16 wherein said row selector code comprises a code wherein each logical two bit segment of said binary plaintext is coded wherein a binary 00 plaintext segment is converted to a binary 1000 selector code, a binary 01 plaintext segment is converted to a binary 0100 selector code, a binary 10 plaintext segment is converted to a binary 0010 selector code, and a binary 11 plaintext segment is converted to a binary 0001 selector code.

21. A method as set forth in claim 20 wherein said row selector code is utilized to select one row of a four row segment of said matrix K to participate in said encryption process.

22. A method as set forth in claim 21 wherein bit locations above and to a right side of the diagonal are filled with pseudorandom, noise logic states, and bit locations below and to a left side of the diagonal are filled with pseudorandom "replacement" logic states such that columns of said "replacement" logic states, when added modulo-2, result in logic states comprising a replacement bit removal value.

23. A method as set forth in claim 22 wherein step (5) of adding said selected rows of matrix T modulo-2 results in a disguised, first intermediate value which, when added modulo-2 with said removal value, produced said first intermediate block of ciphertext.

24. A method for unidirectional communications and digital signature creation and validation comprising the method of claim 16 wherein a first party possesses an encryption method including the method as set forth in steps 1-4 of claim 16, and a second party possesses a decryption method including the method as set forth in steps 5-11 of claim 16, wherein said first party encrypts plaintext with said encryption method and transmits a first ciphertext thereof to said second party, producing said plaintext, and where said plaintext may be reencrypted as a digital signature by said decryption method of said second party, producing a second ciphertext that is transmitted to said first party, producing and verifying said digital signature.

25. A method for bidirectional communications comprising said steps 1-11 of claim 16 wherein said plaintext is applied to said steps 1-4 of claims 16, producing a ciphertext decryptable into said plaintext by said steps 5-11 of claim 16.

26. A method for communications between a central computer located in a central location and a plurality of parties wherein each said party is provided with a smart card incorporating a computer therein and further comprising private keys and a decryption method as set forth in steps 5-11 of claim 16, and said central computer comprising a plurality of public keys and an encryption method as set forth in steps 1-4 of claim 16 for said plurality of said private keys.

27. A method for encrypted communications of a text between a station A and a station B wherein said text is encrypted by an encryption method comprising the steps of:

(1) said station A and said station B each generating a single, rectangular binary matrix K having row identifier digits each of a particular logic state encoded in discrete segments therein, said matrix K generated by multiplying a rectangular matrix T having the row identifier digits embedded therein by a non-singular binary matrix M having an inverse $M^{-1}$, (2) said station A and said station B exchanging respective said binary matrix K, (3) encrypting said text by selecting rows of said matrix $M^{-1}$ by particular bit states of said ciphertext;

(4) adding digits of said rows selected by said particular bit states modulo-2 to produce an intermediate text wherein first two most significant digits thereof are a first set of said row identifier digits, (5) utilizing said first set of said row identifier digits to select at least a first portion of a first row of said matrix T, (6) adding modulo-2 said first intermediate text, exclusive of said row identifier digits, and said first portion of said first row of said matrix T, exclusive of bit positions of said row identifier digits, to obtain a second intermediate text wherein most significant digits thereof are a second set of row identifier digits, (7) utilizing said second set of row identifier digits to select at least a second portion of a second row of said matrix T, (8) adding modulo-2 said second second intermediate text, exclusive of said row identifier digits, to said second portion of said second row of said matrix T, exclusive of bit positions of said row identifier digits, to obtain a third intermediate text, (9) successively repeating steps 7 and 8 for N number, where N is a positive integer, of iterations thereof until said text is encrypted, producing a first encrypted text,

(10) coding the encrypted text into a nonlinear row selector code wherein each discrete segment thereof comprises digits of a particular logic state for selecting a particular row of said matrix K of said station B,

(11) selecting a discrete row of said matrix K of said station B with said digits of a particular logic state,

(12) adding columnwise said rows of said matrix K selected by said digits of a particular logic state modulo-2 to produce a second encrypted text,

(13) communicating said second encrypted text to said station B,

(14) beginning a decryption of said second encrypted text by selecting rows of said matrix $M^{-1}$ of station B by particular logic states of said second encrypted text,

(15) adding columnwise said rows of said matrix K of station B selected by said particular logic states to produce a first intermediate decrypted text wherein two most significant digits thereof are a first set of row identifier digits for said matrix T of said station B and a first portion of said first encrypted text,

(16) utilizing said first set of said row identifier digits of said matrix T of said station B to select at least a first portion of a first row of said matrix T of said station B,

(17) adding said first intermediate decrypted text, exclusive of said row identifier digits, modulo-2 with said first portion of said first row of said matrix T of said station B, exclusive of digit positions of said row identifier digits of said matrix T of said station B, to produce a second intermediate decrypted text wherein most significant digit positions thereof are a second set of said row identifier digits for said matrix T and a second portion of said first encrypted text,

(18) utilizing said second set of said row identifier digits to select at least a second portion of a second row of said matrix T of said station B,

(19) adding said second intermediate decrypted text, exclusive of said row identifier digits, modulo-2 with said second portion of said second row of said matrix T selected by said second set of said last-named row identifier digits, exclusive of digit positions of said second row identifier digits, to produce a third intermediate decrypted text wherein most significant digit positions are a third set of row identifier digits and a third portion of said first encrypted text,

(20) sequentially repeating steps 18 and 19 for N-number, where N is a positive integer, of iterations until all portions of said first encrypted text is recovered,

(21) coding said first encrypted text into a nonlinear row selector code wherein each discrete segment thereof comprises digits of said particular logic state for selecting a particular row of said matrix K of said station A,

(22) selecting a discrete row of said matrix K of said station A with said last-named digits of said particular logic state,

(23) adding columnwise said rows of said matrix K of said station A selected by said last named digits of said particular logic state modulo-2 to produce said text.

28. A method for effecting a first cryptographic transform of binary data comprising the steps of:

(1) generating a rectangular binary matrix K by multiplying a rectangular matrix T having row identifiers comprising at least two digits of selected logical states embedded in each discrete row therein by a non-singular binary matrix M having an inverse $M^{-1}$, said row identifiers utilized in a second cryptographic transform for reversing said first cryptographic transform;

(2) coding a block of binary data into a segmented, nonlinear row selector code wherein each discrete segment of said code contains a row selector;

(3) selecting discrete rows of said matrix K in accordance with a particular bit state of each said row selector and;

(4) adding columns of selected said rows of said matrix K modulo-2 to produce a block of cryptographically transformed binary data.

29. A method for effecting a cryptographic transform on a set of binary data which is a product of a rectangular matrix T having a row identifier comprising at least two bits of a selected logic state in each row thereof, and a matrix M, said first set of binary data comprising a series of segments of data, each said segment further containing a discrete row selector each utilized to select a discrete row of a matrix $M^{-1}$ and comprising the steps of:

(1) adding columns of rows of said matrix $M^{-1}$ selected by each said row selector, modulo-2, producing a first intermediate block of binary data wherein at least two most significant bits thereof contain a first said row identifier therein;

(2) utilizing said first row identifier to select at least a portion of a first row of said matrix T ;

(3) adding modulo-2 said portion of said first row of matrix T with said first intermediate block to produce a second intermediate block containing a second said row identifier therein;

(4) utilizing said second row identifier to select at least a portion of a second row of said matrix T;

(5) adding modulo-2 said portion of said second row of said matrix T with said second intermediate block to produce a third intermediate block containing a third row identifier therein; and (6) successively repeating steps (4) and (5) with successive said row identifiers for N number, where N is a positive integer, of said rows of matrix T, corresponding said row identifiers and said intermediate blocks until the cryptographic transform is complete.

30. A circuit for generating a cryptographic key comprising:
a first matrix generator for generating a nonsingular, square matrix;
a second matrix generator for generating a singular matrix wherein each row contains a plurality of digits where at least two of said digits are discrete row identifiers of predetermined logic state and a remainder of said digits which are not row identifiers; and
combining logic means for combining said singular and nonsingular matrices to form a key matrix.

31. A circuit as set forth in claim 30 including an inverse matrix generator for generating an inverse matrix to said nonsingular matrix.

32. A circuit as set forth in claim 31 for encrypting a sequence of data comprising:
a sequence of data to be encrypted;
a key matrix storage register disposed for storing said key matrix therein in like ordered rows and columns as said key matrix;
first row selector means for selecting discrete rows of said key matrix in accordance with predetermined bit states of segments of said data sequence; and modulo-2 combining logic means for combining said selected rows of said key matrix and providing as an output an encrypted block of data.

33. A circuit as set forth in claim 32 for decrypting said encrypted block of data comprising;

a singular matrix storage register disposed for storing said singular matrix therein in like ordered rows and columns as said singular matrix;

an inverse matrix storage register disposed for storing said inverse register in like ordered rows and columns as said inverse matrix;

matrix row selector means responsive to predetermined bit states of said inverse matrix, for selecting discrete rows of said inverse matrix;

first modulo-2 addition means, for adding said selected rows of said inverse matrix modulo-2, producing a first intermediate block of data having a first said row identifier and a portion of said data sequence therein;

first decoder logic means responsive to said first row identifier, for providing as an output an enabling logic state, said enabling logic state coupled to said singular matrix storage register, for selecting a first row of said singular matrix storage register;

second modulo-2 addition logic means, for adding modulo-2 said first row of said singular matrix storage register with a portion of said first intermediate block of data exclusive of said row identifier and said portion of said sequence of data therein, and producing as an output a second block of data; and N-number of decoder logic means and modulo-2 addition means coupled to successive portions of said singular matrix, with each discrete modulo-2 addition means providing as a portion of an output therefrom, a said row identifier in turn coupled to a next one of said N-number of decoder logic means, and said modulo-2 addition means also producing as a portion of said output therefrom a portion of said sequence of data to be encrypted, said row identifiers for selecting a next row of said singular matrix storage register to sequentially produce N-number of blocks of intermediate data and N-number of portions of said sequence of data until said complete sequence of data is received.

34. A circuit for encrypting and decrypting plaintext data and including encryption circuitry comprising:

encoder circuitry for converting said plaintext data into a row selector code having discrete segments with a row selector in each said segment;

a first memory storage register having a plurality of first memory locations disposed for storing said row selector code;

a plurality of first AND gate logic means, one of each responsive to one of each said first memory locations and to a control signal, for selectively passing said row selectors;

a plurality of first AND gate logic means, one of each responsive to one of each said first memory locations and to a control signal, for selectively passing said row selectors stored in certain ones of said first memory locations as enabling signals;

a public key storage register containing a public key matrix K and having a plurality of like ordered row and columns of second memory locations corresponding to digit positions of said matrix K, said matrix K generated by combining a nonsingular matrix M with a rectangular matrix T having a row identifier in each discrete row thereof so that matrix K embodies a said row identifier in each discrete row thereof;

a plurality of second AND gate logic means, one of each responsive to one of each said second memory locations having a said row selector stored therein and to said plurality of first AND gate logic means and arranged in like ordered rows and columns such that discrete rows of said second AND gate logic means associated with said rows of said second memory locations are selectively enabled by said row selectors from said first AND gate logic means, for passing logic levels of rows of said second memory locations to participate in the encryption process;

a first plurality of X-OR logic means, one of each responsive to one of each of said columns of said second AND gate logic means, for adding said columns of said rows selected by said row selectors modulo-2, producing a binary ciphertext wherein each discrete segment thereof contains a said row identifier, and further including decryption circuitry comprising:

a second memory storage register having a plurality of third memory locations disposed for storing said ciphertext;

a plurality of third AND gate logic means, one of each responsive to one of each said memory locations having a said row identifier stored therein and to a control input, for selectively passing each said row identifier as an enabling signal, a first private key memory storage register containing a private key matrix $M^{-1}$ and having a plurality of like ordered rows and columns of third memory locations corresponding to digit positions of said matrix $M^{-1}$, a plurality of fourth AND gate logic means arranged in like ordered rows and columns as said third memory locations and responsive to one of each said third memory locations and to one of each said row identifiers from said third AND gate logic means such that each said fourth AND gate logic means are enabled by said row identifiers from said second AND gate logic means, for passing logic levels of selected rows of said third memory locations to participate in the decryption process;

a second plurality of X-OR logic means, one of each responsive to one of each of said columns of said fourth AND gate logic means, for adding columns of said selected rows of said private key memory storage register modulo-2, producing a first intermediate block of data wherein first two most significant digits thereof are first most significant digits of said plaintext data and further containing a first said row identifier;

a first decoder responsive to said first two most significant digits of said first intermediate block, for decoding said first row identifier therein and providing a selecting output on one of a first plurality of outputs, a second private key memory storage register containing said matrix T and having like ordered plurality of rows of fifth memory storage locations corresponding to rows of said matrix T, a plurality of fifth AND gate logic means configured in a plurality of like ordered rows as said rows of said fourth memory storage locations, with each discrete AND gate logic means of said rows of said fifth AND gate logic means each having a first input coupled to one of each said fourth memory storage locations exclusive of two most significant digits thereof, for passing logic levels of a first row of said fifth memory storage locations, exclusive of two most significant digits thereof, selected by said first decoder to participate in the decryption process;

a third plurality of X-OR logic means, one of each responsive to said first row of said fifth memory storage locations selected by said first decoder and to digit positions of said first intermediate block exclusive of said first two most significant digits thereof, for adding columnwise logic states of said selected first row and said digit positions of said first intermediate block to produce a second intermediate block wherein at least two most significant digit positions of said second intermediate block are second most significant digits of said plaintext data and contain a second row identifier therein;

a second decoder responsive to said two most significant digit positions of said second intermediate block, for decoding said second row identifier therein and providing a selecting output of one of a second plurality of outputs, one of each of said second plurality of outputs coupled to selected ones of said rows of said plurality of fifth AND gate logic means other than said rows coupled to said first decoder, for selecting a second row of said fifth memory locations;

a fourth plurality of X-OR logic means, one of each responsive to said second intermediate block exclusive of four most significant digit positions thereof and not coupled to said second decoder, for adding columnwise logic states of said second row, exclusive of said four most significant digits thereof not coupled to said second decoder, for adding columnwise logic states of said second row, exclusive of said second row identifier therein to produce a third intermediate block wherein at least two most significant digit positions thereof are third most significant digits of said plaintext data and contain a third row identifier therein, whereby:

the above-described process of iteratively adding portions of the intermediate blocks, exclusive of the row identifier therein, modulo-2 with corresponding least significant digit positions of rows of said fifth memory locations each selected in accordance with a decoded said row identifier of corresponding said intermediate blocks is repeated until the plaintext is recovered.

35. A circuit as set forth in claim 34 wherein said decoders receive said row identifiers ad provide an enabling output on one of four outputs such that a 00 row identifier enables a first said output, a 01 row identifier enables a second said output, a 10 row identifier enables a third said output, and a 11 row identifier enables a fourth said output.

36. A system for encrypting a first set of digital plaintext in a serially arranged sequence of binary bits comprising:
first digital means for transferring said plaintext by a nonlinear transformation into a second set of digital data; and
second digital means for transforming said second set into a third set of serially arranged binary ciphertext wherein said first set of digital plaintext is encrypted by a consolidation K of a plurality of discrete and distinguishable linear transforms wherein said plurality of linear transforms cannot be derived from said consolidation of K.

37. A system as set forth in claim 36 for decrypting a set of digital data encrypted by said nonlinear transformation and said linear transforms by applying selected properties and inverse processes of said nonlinear transformation and said linear transforms to said encrypted data.

38. A system as set forth in claim 37 for creating pseudorandom digital data sequences by transforming digital data by said system for revealing a set of digital data into said pseudorandom sequences.

39. A system as set forth in claim 37 for creating digital signatures by transforming digital data representing said signature by said system for decrypting encrypted data.

40. A system as set forth in claim 36 wherein said plurality of transforms comprises at least two rectangular matrices T and M, and said consolidation K comprises the matrix product of at least matrices T and M such that $K = T \times M$, where M is a nonsingular matrix serving to disguise T.

41. A system as set forth in claim 36 for verifying pseudorandom digital data sequences created by said method for revealing data by transforming said pseudorandom sequences by said method for concealing data.

42. A system as set forth in claim 36 for verifying digital signatures by transforming said transformed digital signature by said method for encrypting data.

43. A method as set forth in claim 36 wherein said plurality of linear transforms comprises two integers T and M, and said consolidated transform K comprises the quotient T/M of said two integers, where M is selected to divide T evenly, and where said method of concealing comprises the steps of:
(1) transforming a fourth set P' plaintext represented by an integer P' by a nonlinear transformation of P' to a fifth set comprising an alternate representation R of said integer P' and multiplying said R by said K' to form product $R \times K'$ from which high order digits are truncated to form a sixth set of ciphertext concealing said fourth set; and
(2) revealing said fourth set P' by multiplying said sixth set C' by M to form product $C' \times M$ and truncating high order digits of said product to form an intermediate result and transforming said intermediate result by an iterative subtractive process responsive to transforming integer T to reveal said fifth set by successively revealing higher order digit paris of R beginning with the low order digit pair of R and by transforming said fifth set as revealed into said fourth set P' by concatenating the right-most digits of said pairs of said fifth set.

44. A digital system for generating a cryptographic key for encrypting binary data comprising:
first digital matrix generation means for generating an invertable digital matrix,
second digital matrix generation means for generating a noninvertable digital matrix, said noninvertable matrix characterized by selectively arranged sets of digits in each row of said noninvertable matrix and utilized as row identifiers; and
matrix combining means for combining said invertable matrix and said noninvertable matrix and providing a second noninvertable matrix having said row identifiers therein.

45. A digital system as set forth in claim 44 further comprising :
- block encoding means responsive to a discrete sized sequence of digital data for converting n-length sequential sets of the digital data into a second, nonlinear data stream wherein a particular logic state of each bit each indicates a selection of a discrete row of said second noninvertable matrix;
- first matrix storage means for storing said second noninvertable matrix;
- first selection means responsive to each said particular logic state of said second data stream, for selecting digits from said second noninvertable matrix, and providing said last-named digits as an output; and
- combining means for combining said last-named digits to provide said differently ordered data sequence converted from said ordered sequence of digital data.

46. A digital system as set forth in claim 45 comprising:
- third digital generation means for generating an inverse matrix to said invertable digital matrix and providing said inverse matrix as an output;
- second matrix storage means for storing said inverse matrix and said second selection means responsive to particular logic states of said differently ordered data sequence, for selecting discrete digital outputs from said second storage means; and
- combining means for combining said discrete digital outputs, and providing a second digital sequence as an output.

47. A digital system as set forth in claim 46 wherein said invertable matrix is further characterized by:
- a first set of digits on one side of said diagonal and a second set of digits on an opposite side of said diagonal;
- third matrix storage means for storing said invertable matrix and sequentially providing selected digits of discrete rows thereof as outputs; and
- a plurality of modulo-2 addition means for adding modulo-2, in a sequential manner, selected rows of said third matrix storage means and at least a portion of an output from a prior modulo-2 addition, with an output from each said plurality of modulo-2 addition means providing as an output one of said row identifiers to one of said plurality of selection means and a portion of said ordered sequence of digital data until all of said ordered sequence of digital data is recovered.

* * * * *